US009354403B2

(12) United States Patent
Seetharam et al.

(10) Patent No.: US 9,354,403 B2
(45) Date of Patent: May 31, 2016

(54) OPTICAL COMMUNICATIONS MODULE HAVING A FLOATING FERRULE THAT REDUCES WIGGLE LOSS

(71) Applicant: Avago Technologies General IP (Singapore) Pte. Ltd., Singapore (SG)

(72) Inventors: Venkatesh Seetharam, Fremont, CA (US); Robert G. Ritter, Los Altos, CA (US); Frank D. Yashar, Cupertino, CA (US); Sunil Priyadarshi, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 307 days.

(21) Appl. No.: 14/029,143

(22) Filed: Sep. 17, 2013

(65) Prior Publication Data

US 2015/0301293 A1    Oct. 22, 2015

(51) Int. Cl.
*G02B 6/38* (2006.01)
*G02B 6/42* (2006.01)

(52) U.S. Cl.
CPC .............. *G02B 6/3875* (2013.01); *G02B 6/387* (2013.01); *G02B 6/3825* (2013.01); *G02B 6/4277* (2013.01); *G02B 6/4292* (2013.01); *G02B 6/4249* (2013.01)

(58) Field of Classification Search
None
See application file for complete search history.

(56) References Cited

U.S. PATENT DOCUMENTS

| 7,614,913 | B2 | 11/2009 | Ice | |
|---|---|---|---|---|
| 2012/0099819 | A1* | 4/2012 | Valencia | ................ G02B 6/383 385/54 |
| 2012/0141086 | A1 | 6/2012 | Greub et al. | |

OTHER PUBLICATIONS

KAIAM Corporation, QSFP Tosa/Rosa, Product Description, Jul. 2005, p. 1-3, KAIAM Corporation, United States.
Methode Electronics, SFF Optical Transceiver LC vs. MT-RJ Geometric Comparison, Report, Dec. 1999, p. 1- 13, Methode Electronics, Chicago, United States.

* cited by examiner

*Primary Examiner* — Jerry Rahll

(57) ABSTRACT

A ferrule of an optical communications module is allowed to float to a limited degree within the module housing. Consequently, if a force is exerted on the connector that mates with the optical communications module, the mated ferrules of the module and of the connector moves, or floats, within defined limits so that the ferrules move together rather than relative to one another. In this way, the end faces of the ferrules remain in precise alignment to prevent wiggle losses from occurring due to movement of the connector relative to the module housing.

29 Claims, 4 Drawing Sheets

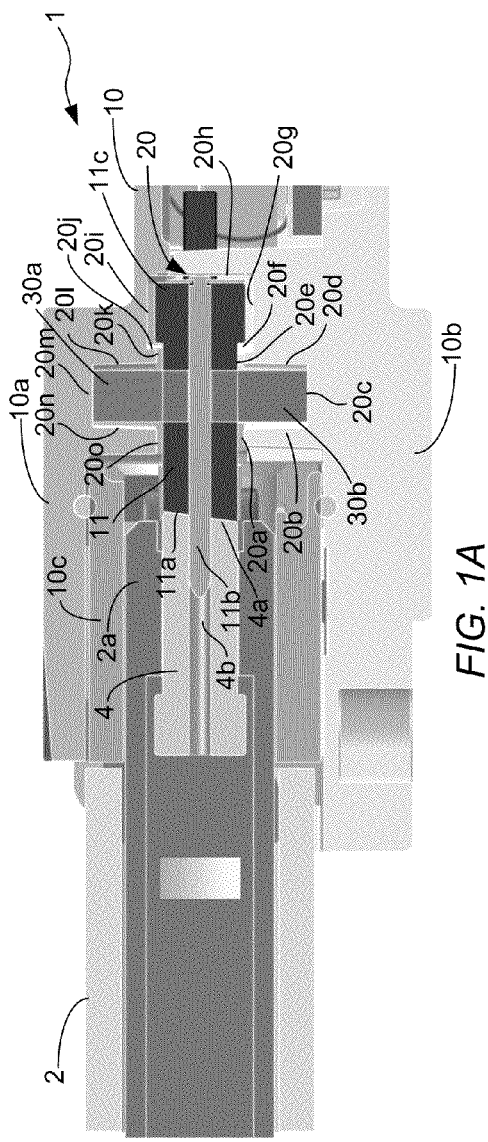
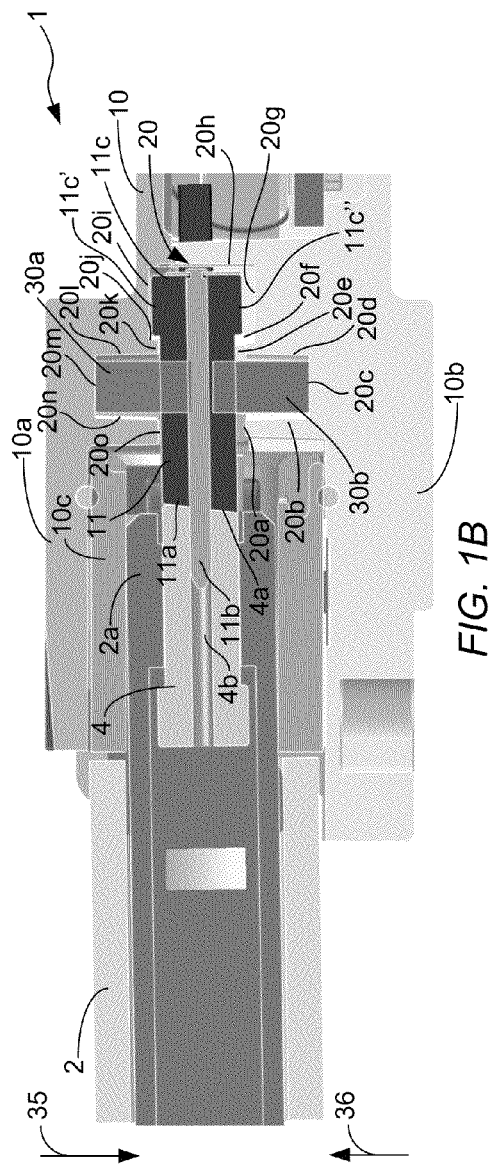
FIG. 1A
FIG. 1B

OPTICAL COMMUNICATIONS MODULE HAVING A FLOATING FERRULE THAT REDUCES WIGGLE LOSS

TECHNICAL FIELD OF THE INVENTION

The invention relates to optical communications. More particularly, the invention relates to an optical communications module having a floating ferrule that reduces wiggle loss.

BACKGROUND OF THE INVENTION

In optical communications networks, optical communications modules are used to transmit and/or receive optical signals over optical fibers. Optical communications modules include optical transmitter modules, optical receiver modules and optical transceiver modules. An optical transmitter module has optical transmit capability, but does not have optical receive capability. An optical receiver module has optical receive capability, but does not have optical transmit capability. An optical transceiver module has both optical transmit and optical receive capabilities.

In an optical transmitter or transceiver module, one or more light sources (e.g., laser diodes) generate amplitude modulated optical signals that represent data, which are directed by an optics system of the module into an end of one or more transmit optical fibers of an optical fiber cable. The signals are then carried over the transmit fiber to a receiver node of the network. In an optical receiver or transceiver module, an optics system of the module receives optical signals output from an end of one or more receive optical fibers of an optical fiber cable and directs the optical signals onto an optical detector (e.g., a photodiode), which converts the optical signals into electrical signals. The electrical signals are then processed to recover the data bits contained in the signals.

The optical fiber cables have connectors on their ends (e.g., LC connectors, MTP connectors, etc.) that are adapted to mate with receptacles disposed in a housing of the optical communications module. One type of known connector that is used for this purpose includes a mechanical transfer (MT) ferrule that holds the end portions of a plurality of optical fibers in respective tube-like structures formed in the ferrule. The tube-like structures of the MT ferrule extend to respective openings formed in an outer end face of the ferrule. The end faces of the fibers are polished and are flush with the outer end face of the ferrule to provide a one- or two-dimensional array of fiber end faces disposed in the outer end face of the ferrule.

The MT ferrule has two precisely molded alignment holes formed on either side of the array of openings. The two alignment holes are shaped and sized to receive two steel guide pins disposed on an outer end face of a mating MT ferrule that is disposed within the receptacle of the optical communications module housing. The mating MT ferrule has an array of lenses disposed in the outer end face thereof that are in precise alignment with the array of fiber end faces disposed in the outer end face of the MT ferrule of the connector when the two ferrules are engaged with one another in a mated configuration. When the ferrules are engaged with one another in the mated configuration, features of the module housing and of the connector hold the ferrules rigidly to prevent movement of the ferrules relative to one another. This rigid mated configuration is intended to ensure that the array of fiber end faces of the connector MT ferrule and the array of lenses of the module MT ferrule are maintained in precise alignment with one another.

Although the features of the module housing and of the connector generally prevent movement of the ferrules relative to one another, a very small amount of relative movement can occur when forces are exerted on the connector, i.e., when the connector is wiggled. Such relative movement can result in the occurrence of optical losses, typically referred to as wiggle losses. Wiggle losses result in signal degradation that can detrimentally impact performance. If MT ferrules are multimode ferrules, the wiggle losses are generally considered negligible and are not viewed as detrimentally impacting performance. If the MT ferrules are single mode ferrules, however, wiggle losses generally cannot be ignored and can have a major detrimental impact on performance. For this reason, efforts have been made to incorporate features into the connector and/or into the module housing to prevent relative movement from occurring between the MT ferrules. Such efforts, however, have had only limited success.

Accordingly, a need exists for a way to prevent, or at least reduce, relative movement between the connector ferrule and the module ferrule when they are in the mated configuration to prevent, or at least reduce, wiggle losses.

SUMMARY OF THE INVENTION

The invention provides an optical communications module and an optical communications system that comprises a mated configuration of the module and a connector. The optical communications module comprises a module housing, a module ferrule disposed in the module housing, and a module ferrule centering mechanism disposed in the module housing. The module housing comprises at least first and second housing portions that are secured together to form the module housing. The module housing has a nose portion that defines a receptacle in the module housing for mating with an end portion of a connector. The module ferrule is in a floating arrangement that allows the module ferrule to float, or move, inside of the module housing within limits. The module ferrule is configured to mate with a connector ferrule of the connector in a mated configuration when the end portion of the connector is engaged with the receptacle of the module housing. If a tilt force is exerted on the connector, the tilt force causes the mated configuration of the ferrules to move as a unitary part within the limits due to the floating arrangement. This prevents movement of the ferrules relative to one another so that the ferrules remain in precise alignment with one another to prevent wiggle losses from occurring. The module ferrule centering mechanism is mechanically coupled to the module ferrule and urges the module ferrule to a centered position if the module ferrule is moved from the centered position as a result of the tilt force exerted on the connector.

The optical communications system comprises an optical communications module and a connector that are mated together. The optical communications module comprises a module housing and a module ferrule disposed in the module housing. The module housing comprises at least first and second housing portions that are secured together to form the module housing. The module housing has a nose portion that defines a receptacle in the module housing. The module ferrule is disposed in the module housing in a floating arrangement that allows the module ferrule to float, or move, inside of the module housing within limits. An end portion of the connector is engaged with the receptacle of the module housing. The connector has a connector ferrule that is engaged with the module ferrule in a mated configuration. If a tilt force is exerted on the connector, the tilt force causes the mated configuration of the ferrules to move within the limits as a unitary part due to the floating arrangement.

This prevents movement of the ferrules relative to one another so that the ferrules remain in precise alignment with one another to prevent wiggle losses from occurring.

These and other features and advantages of the invention will become apparent from the following description, drawings and claims.

BRIEF DESCRIPTION OF THE DRAWINGS

FIG. 1A illustrates a side cross-sectional view of an optical communications module in accordance with an illustrative embodiment mated with a connector and having a mated ferrule configuration that is depicted in a centered position.

FIG. 1B illustrates a side cross-sectional view of an optical communications module in accordance with an illustrative embodiment mated with a connector and having a mated ferrule configuration that is depicted in a tilted position.

DETAILED DESCRIPTION OF AN ILLUSTRATIVE EMBODIMENT

Figure 2:
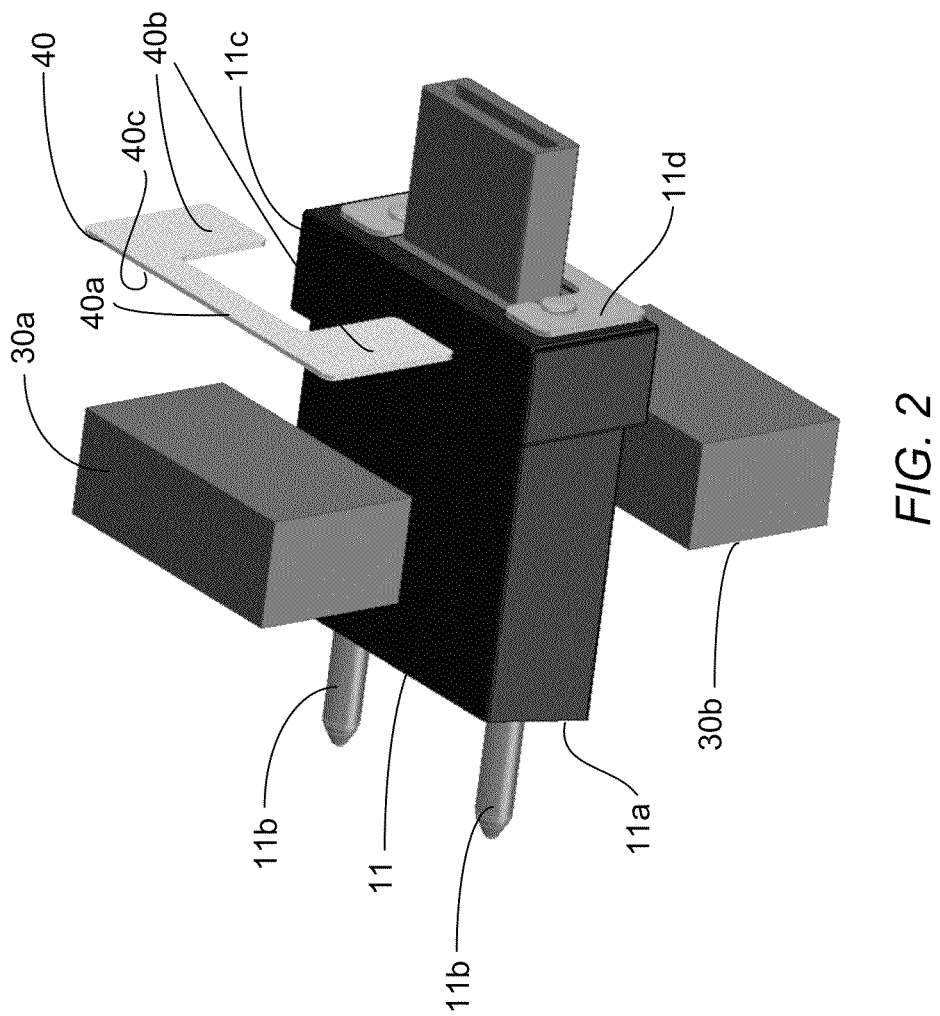
FIG. 2 illustrates a top perspective view of a module MT ferrule, upper and lower centering devices and an EMI shielding device of the optical communications module shown in FIGS. 1A and 1B.

In accordance with embodiments described herein, the MT ferrule of the optical communications module is allowed to float to a limited degree within the module housing. Consequently, if a force is exerted on the connector MT ferrule while the MT ferrules are engaged in the mated configuration, the mated configuration moves to a limited extent so that the MT ferrules move together as a unit rather than relative to one another. In this way, the fiber end faces disposed in the outer end face of the connector MT ferrule remain in precise alignment with the lenses disposed in the outer end face of the module MT ferrule to prevent wiggle losses from occurring.

In accordance with an illustrative, or exemplary, embodiment, a cavity in the module housing in which a portion of the module MT ferrule is disposed is enlarged to provide additional space for the module MT ferrule to move to a limited extent, or float, within the module housing. If a force is exerted on the connector while the module MT ferrule and the connector MT ferrule are in the mated configuration, the exerted force causes the mated configuration to move as a unit relative to the module housing due to the floating module MT ferrule. This prevents forces from being exerted on the MT ferrules that might result in relative movement between them.

The enlarged cavity of the module housing increases the size of an aperture associated with the cavity. Additional radiated emissions could possibly pass through the enlarged cavity and escape from the module housing. In order to prevent this from happening, an EMI shielding device is provided in the module housing to reduce the aperture size, thereby providing additional EMI shielding. Illustrative embodiments will now be described with reference to FIGS. 1A-4, in which like reference numerals represent like elements, features or components.

FIGS. 1A and 1B illustrate side cross-sectional views of an optical communications module 1 in accordance with an illustrative embodiment mated with a connector 2. The optical communications module 1 has a module housing 10 that has an upper housing portion 10a and a lower housing portion 10b. The upper and lower housing portions 10a and 10b are secured to one another and are typically made of a metallic material, such as zinc or aluminum, for example. Typically, the upper and lower housing portions 10a and 10b are made of a nickel-coated zinc alloy. The invention is not limited with respect to the metallic material of which the housing is made or with respect to the number of parts that make up the housing. A nose portion 10c of the module housing 10 has a receptacle formed therein for receiving an end portion 2a of the connector 2. The end portion 2a of the connector 2 has an MT ferrule 4 disposed therein. The MT ferrule 4 has an outer end face 4a that extends a small distance away from the end portion 2a of the connector 2 in the direction toward an MT ferrule 11 of the module 1.

The module MT ferrule 11 and the connector MT ferrule 4 are shown in FIGS. 1A and 1B engaged in a mated configuration. In the mated configuration, the outer end face 4a of the connector MT ferrule 4 is in abutment with an outer end face 11a of the module MT ferrule 11 and two steel pins 11b disposed on the outer end face 11a of the module MT ferrule 11 are fully inserted into respective precision alignment holes 4b formed in the connector MT ferrule 4. In the mated configuration shown in FIGS. 1A and 1B, end faces of a plurality of optical fibers (not shown) disposed adjacent the outer end face 4a of the connector MT ferrule 4 are in precise optical alignment with respective lenses (not shown) disposed adjacent the outer end face 11a of the module MT ferrule 11.

Inside of the module housing 10, a cavity 20 is defined by surfaces 20a, 20b, 20c, 20d, 20e, 20f, 20g, 20h, 20i, 20j, 20k, 20l, 20m, 20n, and 20o of the upper or lower housing portions 10a and 10b. The portions of the cavity 20 defined by surfaces 20b-20d, 20f-20j and 20l-20n provide additional spaces that are not present in the known module housing (not shown). In the spaces defined by surfaces 20b-20d and 20l-20n, a ferrule centering mechanism comprising upper and lower ferrule centering devices 30a and 30b is disposed for centering the module MT ferrule 11 in the cavity 20. In accordance with an illustrative embodiment, the ferrule centering devices 30a and 30b are made of an elastomeric foam material having characteristics of resilience and compliance. These characteristics allow upper and lower ferrule centering devices 30a and 30b to be deformed from their original shapes into deformed shapes when external forces are exerted on them and then restored to their original shapes when the external forces are removed. The upper and lower ferrule centering devices 30a and 30b apply generally equal, but opposite forces to the upper and lower surfaces, respectively, of the module MT ferrule 11 to urge the module MT ferrule 11 toward a centered position in the cavity 20 that is axially aligned with an axially-aligned position of the connector MT ferrule 4.

The surfaces 20f-20j of the cavity 20 provide additional space about a shoulder 11c of the module ferrule 11 that is not present in the known module housing (not shown). In the known module housing, this cavity is designed to prevent any movement of the module MT ferrule, and therefore the corresponding portion of the cavity fits snugly about the outer surfaces of the module MT ferrule so that the ferrule has no freedom to move within the cavity. In contrast, while the module MT ferrule 11 is in its centered position shown in FIG. 1A, the surfaces 20*f*-20*j* of the cavity 20 are not in contact with the shoulder 11*c* and are spaced small distances away from the shoulder 11*c*. This additional space provides the shoulder 11*c* with room to move, or float, to a limited extent within the cavity 20. In FIG. 1B, a force represented by arrow 35 has been exerted on the connector 2 to place the connector 2 in a maximum tilted position. In this position, the mated configuration of the ferrules 4 and 11 is also in a maximum tiled position. In this position, it can be seen that an upper surface 11*c*' of the shoulder 11*c* is in abutment with surface 20*i* of the cavity 20 to prevent further tilting of the mated configuration.

Although not shown, it can be understood that if a force represented by arrow 36 that is equal and opposite to the force represented by arrow 35 is exerted on the connector 2, the connector 2, and thus, the mated configuration of the ferrules 4 and 11, will move to a maximum tilted position in which a lower surface 11*c*" of the shoulder 11*c* is in abutment with surface 20*g* of the cavity 20 to prevent further tilting of the mated configuration. In this way, the surfaces 20*g* and 20*i* of the cavity 20 limit the extent to which the module MT ferrule 11, and thus the mated configuration of the MT ferrules 4 and 11, can float. Provided that the mated configuration remains within these limits, it will float as a unit to thereby prevent relative movement between the ferrules 4 and 11.

When the force 35 or 36 is removed, the forces exerted by the centering devices 30*a* and 30*b* on the module MT ferrule 11 will bias, or urge, it back to the centered position shown in FIG. 1A. While elastomeric foam is a suitable material for providing these biasing forces, other devices, such as, for example, metal springs, may instead be used for this purpose. Likewise, while the surfaces 20*g* and 20*i* of the cavity 20 are used to provide the limits for movement of the module MT ferrule 11, other surfaces or features of the module housing 10 and/or of the module MT ferrule 11 could be used to provide these limits. In addition, the connector MT ferrule 4 rather than the module MT ferrule 11 could be made to float relative to connector 2 to accomplish the same or similar goals. Persons of skill in the art will understand, in view of the description being provided herein, the manner in which such modifications may be made to the illustrative embodiments described herein to achieve the goals of the invention.

FIG. 2 is a top perspective view of the module MT ferrule 11, the upper and lower centering devices 30*a* and 30*b* and an EMI shielding device 40. The EMI shielding device 40 has a horizontal section 40*a* that interconnects two vertical side sections 40*b*. The EMI shielding device 40 has a generally flat structure and is C-shaped. The EMI shielding device 40 is made of a metallic material that is electrically conductive. A side 40*c* of the EMI shielding device 40 is placed in abutment with a back end face lid of the module MT ferrule 11 and acts essentially as a shim that is wedged in between the back end face lid of the module MT ferrule 11 and surfaces of the upper and lower housing portions 10*a* and 10*b*, respectively, as will now be described with reference to FIGS. 3A-4.

Figure 3B:
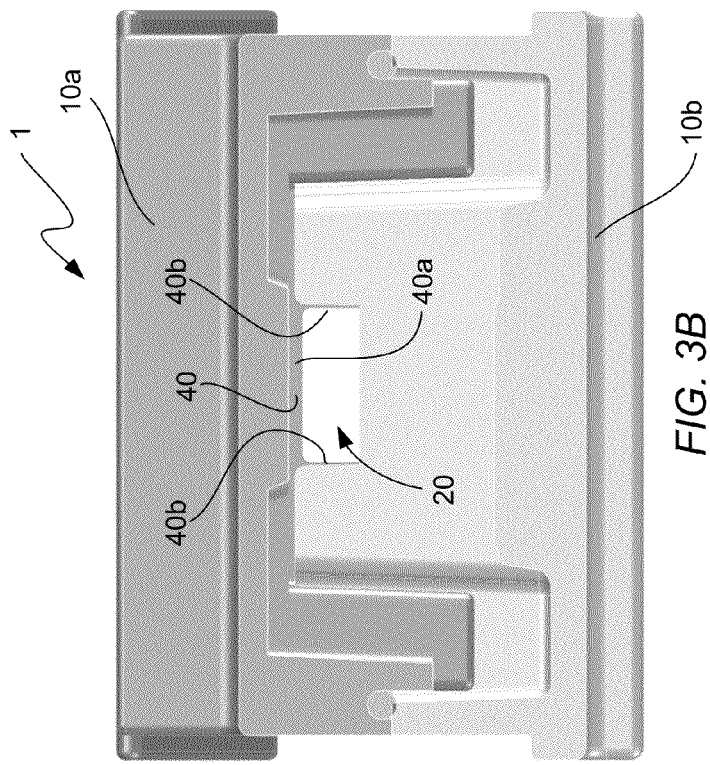
FIG. 3B illustrates a back plan view of the optical communications module with the connector and the MT ferrules shown in FIGS. 1A and 1B removed and with the EMI shielding device shown in FIG. 2 installed.
Figure 3A:
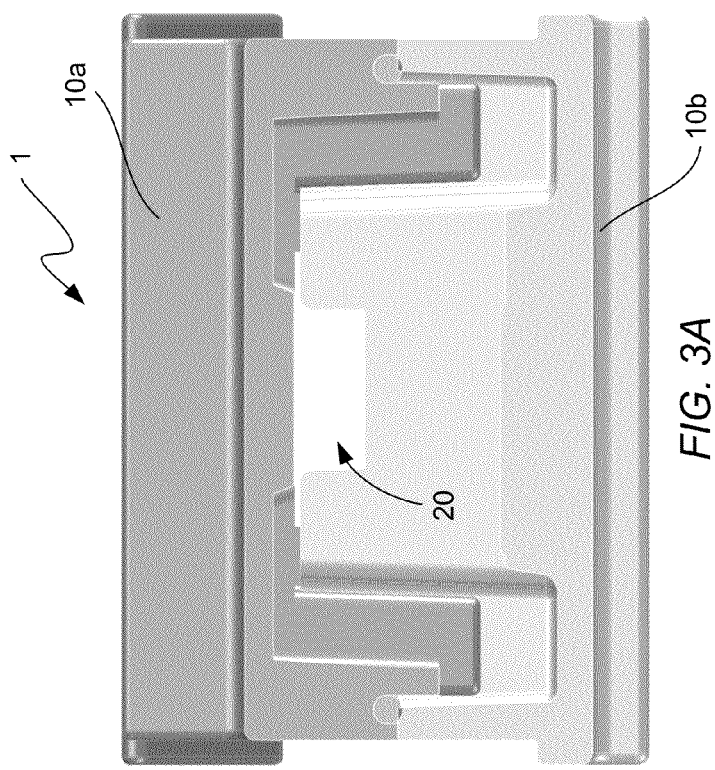
FIG. 3A illustrates a back plan view of the optical communications module with the connector and the MT ferrules shown in FIGS. 1A and 1B removed and with the EMI shielding device shown in FIG. 2 removed.
Figure 4:
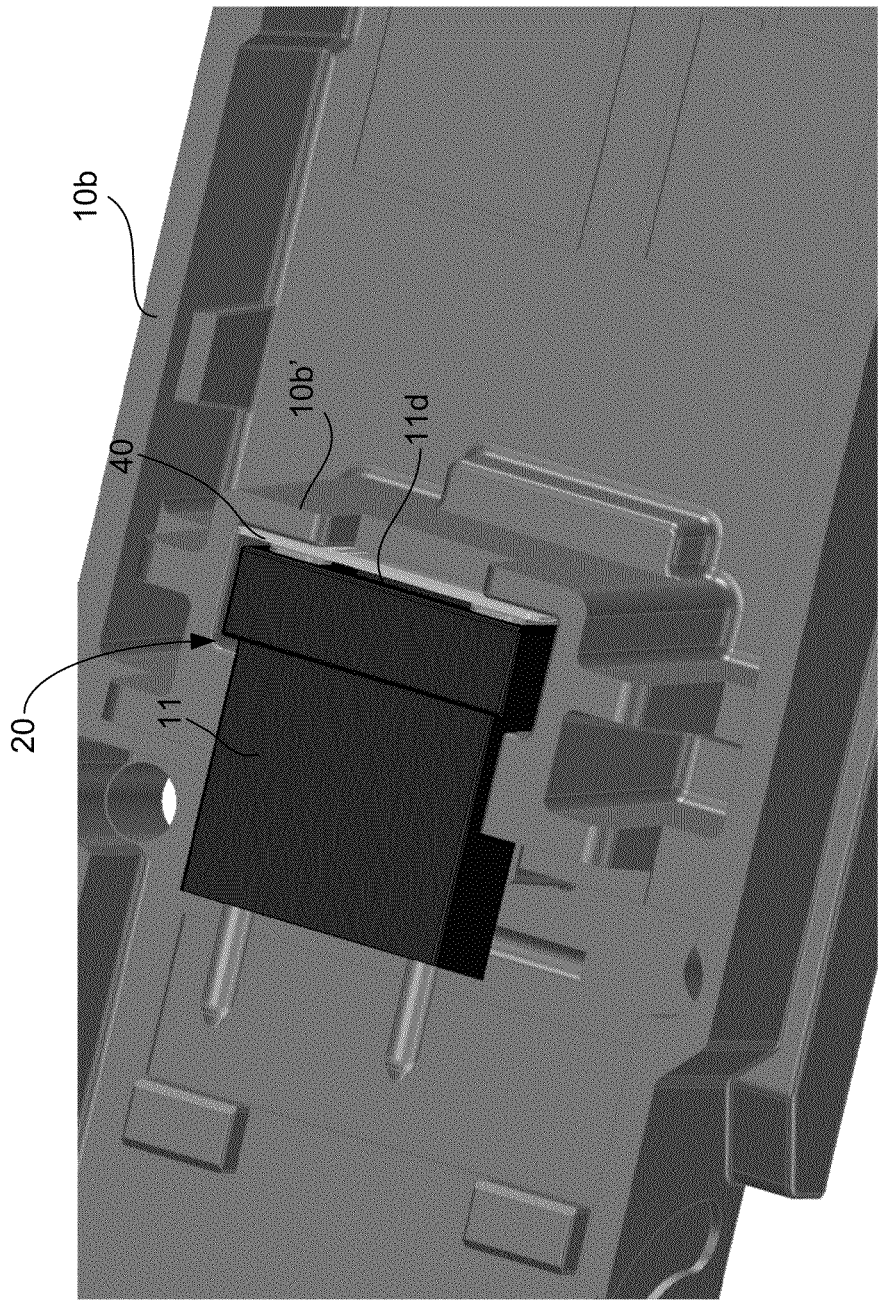
FIG. 4 is a top perspective view of the lower housing portion of the optical communications module shown in FIGS. 1A and 1B with the module MT ferrule and the EMI shielding device shown in FIG. 2 disposed in a cavity formed in the lower housing portion.

FIGS. 3A and 3B illustrate juxtaposed back plan views of the optical communications module 1 shown in FIG. 1 with the connector 2 and the MT ferrules 4 and 11 removed to allow the cavity 20 to be seen from an end view. In FIG. 3A, the optical communications module 1 is also shown with the EMI shielding device 40 removed, whereas in FIG. 3B, the optical communications module 1 is shown with the EMI shielding device 40 installed. FIG. 4 is a top perspective view of the lower housing portion 10*b* with the module MT ferrule 11 and the EMI shielding device 40 disposed in the cavity 20. By comparing FIGS. 3A and 3B, it can be seen that the aperture created by the enlarged cavity 20 is significantly smaller when the EMI shielding device 40 is installed (FIG. 3B) than when it is removed (FIG. 3A). It can be seen in FIG. 3B that portions of the horizontal section 40*a* and of the vertical side sections 40*b* of the EMI shielding device 40 fill in top and side portions of the enlarged cavity 20. It can be seen in FIG. 4 that the EMI shielding device 40 is wedged in between walls 10*b*' of the lower housing portion 10*b* and the back end face lid of the module MT ferrule 11.

When the upper and lower housing portions 10*a* and 10*b* are secured together, as shown in FIG. 3B, the EMI shielding device 40 is in electrically-conductive contact with the upper and lower housing portions 10*a* and 10*b*. It is important that the EMI shielding device 40 provides good volumetric ground contact between the upper and lower housing portions 10*a* and 10*b*. For this reason, the EMI shielding device 40 is typically made of a metallic material that is highly electrically conductive, such as nickel-plated bronze, for example. In the absence of the EMI shielding device 40, the upper and lower housing portions 10*a* and 10*b* may act as an antenna, albeit an inefficient one, disposed very close to an EMI radiation source, such as driver circuitry (not shown) of the module 1 for driving laser diodes (not shown) of the module 1. Because even an inefficient antenna can cause EMI leakage problems, the EMI shielding device 40 is preferably incorporated into the module 1 in the manner described above. However, it should be noted that if the enlarged cavity 20 is not seen as presenting an EMI leakage problem, or if EMI leakage resulting from the enlarged cavity 20 is within constraints, it is not necessary to include the EMI shielding device 40 in the module 1. As will be understood by persons of skill in the art, in view of the description being provided herein, EMI shielding solutions other than that EMI shielding device 40 may be used to achieve the same goals. Therefore, the EMI shielding solution that is used for this purpose may have other configurations, as will be understood by persons of skill in the art in view of the description being provided herein.

It should be noted that the arrangement described above for enabling the mated configuration of the ferrules to float could be accomplished in a variety of ways. The configuration of the enlarged cavity 20 and the ferrule centering devices 30*a* and 30*b* is merely one example of a configuration that may be used for this purpose. It should be noted that persons of skill in the art will understand, in view of the description being provided herein, that a variety of other floating configurations can be designed and used for this purpose within the scope of the invention.

It should be noted that the invention has been described with respect to illustrative embodiments for the purpose of describing the principles and concepts of the invention. The invention is not limited to these embodiments. For example, while the invention has been described with reference to MT ferrules, the invention is not limited to optical communications modules that use these particular types of ferrules, but applies equally to other types of ferrules and mated ferrule configurations that can benefit from use of the invention. Also, if MT ferrules are used, the male MT ferrule could instead be part of the connector and the female MT ferrule could instead be part of the module, instead of the arrangement shown in FIGS. 1A and 1B in which the connector MT ferrule is a female MT ferrule and the module MT ferrule is a male MT ferrule. As will be understood by those skilled in the art in view of the description being provided herein, these and many other modifications may be made to the illustrative embodiments described above to achieve the goals of the invention, and all such modifications are within the scope of the invention.

What is claimed is:

1. An optical communications module comprising:
a module housing comprising at least first and second housing portions that are secured together to form the module housing, the module housing having a nose portion that defines a receptacle in the module housing for mating with an end portion of a connector;
a module ferrule disposed in the module housing in a floating arrangement that allows the module ferrule to float, or move, inside of the module housing within limits, and wherein the module ferrule is configured to mate with a connector ferrule of the connector in a mated configuration when the end portion of the connector is engaged with the receptacle of the module housing, and wherein if a tilt force is exerted on the connector in a transverse direction to a longitudinal axis of the connector, the tilt force causes the mated configuration of the ferrules to move as a unitary part in an opposing transverse direction within the limits due to the floating arrangement of the module ferrule; and
a module ferrule centering mechanism mechanically coupled to the module ferrule, the module ferrule centering mechanism urging the module ferrule to a centered position if the module ferrule is moved from the centered position as a result of the tilt force exerted on the connector.

2. The optical communications module of claim 1, wherein the module ferrule and the connector ferrule are mechanical transfer (MT) ferrules.

3. The optical communications module of claim 2, wherein the connector MT ferrule includes first and second alignment holes formed in a front end face thereof that extend into a body of the connector MT ferrule in directions that are parallel to an optical axis of the connector MT ferrule, and wherein the module MT ferrule has first and second alignment pins disposed on a front end face thereof that extend away from the front end face of the module MT ferrule in directions that are parallel to an optical axis of the module MT ferrule, and wherein when the module MT ferrule and the connector MT ferrule are in the mated configuration, the first and second alignment pins are disposed in the first and second alignment holes, respectively.

4. The optical communications module of claim 2, wherein the module MT ferrule includes first and second alignment holes formed in a front end face thereof that extend into a body of the module MT ferrule in directions that are parallel to an optical axis of the module MT ferrule, and wherein the connector MT ferrule has first and second alignment pins disposed on a front end face thereof that extend away from the front end face of the connector MT ferrule in directions that are parallel to an optical axis of the connector MT ferrule, and wherein when the module MT ferrule and the connector MT ferrule are in the mated configuration, the first and second alignment pins are disposed in the first and second alignment holes, respectively.

5. The optical communications module of claim 2, wherein the module MT ferrule is disposed in a cavity of the module housing that is defined by one or more inner walls of the first housing portion and by one or more inner walls of the second housing portion, and wherein at least a portion of the cavity is enlarged to provide space for a portion of the module MT ferrule to float, or move, to a limited extent without encountering said one or more inner walls that define the cavity.

6. The optical communications module of claim 5, further comprising:
an electromagnetic interference (EMI) shielding device disposed in the module housing in proximity to the module MT ferrule for reducing EMI leakage through the floating arrangement.

7. The optical communications module of claim 6, wherein the EMI shielding device is an EMI shim that is disposed inside of the cavity in between a back end face of the module MT ferrule and one of said one or more inner walls that define the cavity, and wherein the EMI shim reduces a size of an aperture associated with the enlarged portion of the cavity.

8. The optical communications module of claim 7, wherein the EMI shim is made of a material that has a high electrical conductivity.

9. The optical communications module of claim 8, wherein the upper and lower housing portions are made of metal, and wherein the EMI shim is in contact with the upper and lower housing portions.

10. The optical communications module of claim 9, wherein the EMI shim is made of bronze.

11. The optical communications module of claim 10, wherein the bronze is nickel-plated.

12. The optical communications module of claim 5, wherein the module ferrule centering mechanism comprises at least first and second module ferrule centering devices, the first module ferrule centering device being disposed on a first side of the module MT ferrule and the second module ferrule centering device being disposed on a second side of the module MT ferrule that is opposite the first side of the module MT ferrule, the first and second module ferrule centering devices having characteristics of resilience that urge the module MT ferrule in first and second directions, respectively, that are generally opposite one another.

13. The optical communications module of claim 12, wherein the first and second module ferrule centering devices are made of an elastomeric foam material.

14. The optical communications module of claim 12, wherein the first and second module ferrule centering devices are metal springs.

15. The optical communications module of claim 1, further comprising:
an electromagnetic interference (EMI) shielding device disposed in the module housing in proximity to the module ferrule for reducing EMI leakage through the floating arrangement.

16. The optical communications module of claim 15, wherein the EMI shielding device is an EMI shim that is disposed in between a back end face of the module MT ferrule and an inner wall of the first or second housing portions.

17. The optical communications module of claim 16, wherein the EMI shim is made of a material that has a high electrical conductivity.

18. The optical communications module of claim 17, wherein the upper and lower housing portions are made of metal, and wherein the EMI shim is in contact with the upper and lower housing portions.

19. The optical communications module of claim 18, wherein the EMI shim is made of bronze.

20. The optical communications module of claim 19, wherein the bronze is nickel-plated.

21. An optical communications system comprising:
an optical communications module comprising:
a module housing comprising at least first and second housing portions that are secured together to form the module housing, the module housing having a nose portion that defines a receptacle in the module housing; and a module ferrule disposed in the module housing in a floating arrangement that allows the module ferrule to float, or move, inside of the module housing within limits; and a connector, the connector having an end portion that is engaged with the receptacle of the module housing, the connector comprising:

a connector ferrule, the connector ferrule and the module ferrule being engaged with one another in a mated configuration, and wherein if a tilt force is exerted on the connector in one of an upwards direction or a downwards direction, the tilt force causes the mated configuration of the ferrules to move in an opposite direction to the one of the upwards direction or the downwards direction within the limits as a unitary part due to the floating arrangement.

22. The optical communications system of claim 21, wherein the optical communications module further comprises:

a module ferrule centering mechanism mechanically coupled to the module ferrule, the module ferrule centering mechanism urging the module ferrule to a centered position if the module ferrule is moved from the centered position as a result of the tilt force exerted on the connector.

23. The optical communications system of claim 22, wherein the module ferrule and the connector ferrule are mechanical transfer (MT) ferrules, and wherein one of the MT ferrules includes first and second alignment holes and the other of the MT ferrules includes first and second alignment pins, wherein the first and second alignment holes extend from a front end face of the respective MT ferrule into a body of the respective MT ferrule in directions that are parallel to an optical axis of the respective MT ferrule, and wherein the first and second alignment pins are disposed on a front end face of the respective MT ferrule and extend away from the front end face of the respective MT ferrule in directions that are parallel to an optical axis of the respective MT ferrule, and wherein when the module MT ferrule and the connector MT ferrule are in the mated configuration, the first and second alignment pins are disposed in the first and second alignment holes, respectively.

24. The optical communications system of claim 22, wherein the module ferrule centering mechanism comprises at least first and second module ferrule centering devices, the first module ferrule centering device being disposed on a first side of the module ferrule and the second module ferrule centering device being disposed on a second side of the module ferrule that is opposite the first side of the module ferrule, the first and second module ferrule centering devices having characteristics of resilience that urge the module MT ferrule in first and second directions, respectively, that are generally opposite one another.

25. The optical communications system of claim 24, wherein the first and second module ferrule centering devices are made of an elastomeric foam material.

26. The optical communications system of claim 21, wherein the module ferrule is disposed in a cavity of the module housing that is defined by one or more inner walls of the first housing portion and by one or more inner walls of the second housing portion, and wherein at least a portion of the cavity is enlarged to provide space for a portion of the module ferrule to float, or move, to a limited extent without encountering said one or more inner walls that define the cavity.

27. The optical communications system of claim 26, further comprising:

an electromagnetic interference (EMI) shielding device disposed in the module housing in proximity to the module ferrule for reducing EMI leakage through the floating arrangement.

28. The optical communications system of claim 27, wherein the EMI shielding device is an EMI shim that is disposed inside of the cavity in between a back end face of the module ferrule and one of said one or more inner walls that define the cavity, and wherein the EMI shim reduces a size of an EMI aperture associated with the enlarged portion of the cavity.

29. The optical communications system of claim 28, wherein the EMI shim is made of a metal that has a high electrical conductivity, and wherein the upper and lower housing portions are made of metal, and wherein the EMI shim is in contact with the upper and lower housing portions.

* * * * *